(12) United States Patent
Pardo Miro

(10) Patent No.: US 8,986,416 B2
(45) Date of Patent: Mar. 24, 2015

(54) FERTILIZING COMPOUND FOR INCREASING THE CALCIUM CONTENT OF PLANTS AND IMPROVING THE PRESERVATION THEREOF

(75) Inventor: Marco Pardo Miro, Huesca (ES)

(73) Assignee: Argo Stock S.A., Huesca (ES)

( * ) Notice: Subject to any disclaimer, the term of this patent is extended or adjusted under 35 U.S.C. 154(b) by 0 days.

(21) Appl. No.: 14/127,930

(22) PCT Filed: Jul. 5, 2011

(86) PCT No.: PCT/ES2011/070484
§ 371 (c)(1),
(2), (4) Date: Dec. 19, 2013

(87) PCT Pub. No.: WO2012/175759
PCT Pub. Date: Dec. 27, 2012

(65) Prior Publication Data
US 2014/0165682 A1 Jun. 19, 2014

(30) Foreign Application Priority Data
Jun. 24, 2011 (ES) .................................. 201131067

(51) Int. Cl.
*C05C 5/04* (2006.01)
*C05F 11/00* (2006.01)
*C05D 3/00* (2006.01)

(52) U.S. Cl.
CPC .... *C05D 3/00* (2013.01); *C05C 5/04* (2013.01)

USPC ..................................... 71/11; 71/58; 71/64.1

(58) Field of Classification Search
None
See application file for complete search history.

(56) References Cited

U.S. PATENT DOCUMENTS

| 3,706,545 | A | * | 12/1972 | Gray et al. | .......................... 71/1 |
| 7,695,541 | B1 | | 4/2010 | Frizzell | |
| 2010/0313620 | A1 | * | 12/2010 | Armbrust et al. | .................. 71/23 |

FOREIGN PATENT DOCUMENTS

| CN | 101712577 | 5/2010 |
| ES | 2344288 | 8/2010 |
| WO | WO2011/005175 | 1/2011 |

* cited by examiner

*Primary Examiner* — Wayne Langel
(74) *Attorney, Agent, or Firm* — Defillo & Associates, Inc.; Evelyn A. Defillo

(57) ABSTRACT

The invention relates to a fertilizing compound for application to plants and crops, especially fruits, intended for increasing the amount of calcium and subsequently improving the state of health of the plants and the preservation thereof after harvesting. The compound consists of a combination of components such as calcium nitrate, calcium lignosulfonate, organic acids, menadione sodium bisulphite, amino acids and water. The compound is in the form of a liquid preparation, packed in containers of between 20 and 1000 liters, is water-soluble and is applied by fertigation, spraying or in a localized form by border irrigation.

4 Claims, No Drawings

FERTILIZING COMPOUND FOR INCREASING THE CALCIUM CONTENT OF PLANTS AND IMPROVING THE PRESERVATION THEREOF

CROSS REFERENCE TO RELATED APPLICATION

This application is a national stage entry of PCT/ES2011/070484 filed Jul. 5, 2011, under the International Convention claiming priority over Spain Application No. P201131067 filed Jun. 24, 2011.

TECHNICAL FIELD

The present invention relates to a fertilizing compound for increasing the calcium content in plants and improving the preservation thereof.

The development of a formulation intended for increasing the calcium content in a plant to which it is applied is proposed, because said formulation initially improves the root uptake of this element and subsequently the translocation of calcium inside the plant. The fertilizing compound comprises a liquid preparation with a high calcium content, complexed with low molecular weight organic acids and lignosulfonates and enhanced by the substance menadione sodium bisulphite (hereinafter MSB), as well as by amino acids. The liquid formulation is water-soluble and allows being supplied through the root both by border irrigation and by localized irrigation throughout the entire phase of vegetative development of the crop.

The field of application of the invention is comprised within the industrial sector dedicated to the manufacture of fertilizers for agriculture.

STATE OF THE ART

Calcium from soil solution enters through the roots and flows upwards through the xylem. Unlike many other nutrients, calcium cannot be redistributed through phloem to the areas of growth that need calcium to build new tissues.

Calcium is necessary for plant functions, aids in the production of high quality fruits and improves the storage thereof. The role of calcium in fruit resistance after harvesting and during handling by creating strong cell walls that reduce the exudates is known. Furthermore, the availability of calcium neutralizes ethylene, as well as toxins such as oxalic acid and polygalacturonase, produced by fungi and bacteria that invade the plant tissue. Calcium allows better stress regulation in plant, regardless of the cause thereof. It is important to highlight that all forms of stress in plants develop in a similar manner, regardless of their origin. Stress analysis gives more information that aids to understand the functions of calcium. When a plant is stressed in any cycle, the plant protein is hydrolyzed into ammonia. In addition to probably being toxic, the ammonia also causes the plant to produce ethylene. This ethylene causes the deterioration of parts of the plant or of the fruit. If there is not enough calcium to neutralize the ammonia and the ethylene, cell degradation starts a stress cascade, resulting in the onset of physiological disorders such as 'bitter pit' in apple.

As will be understood, calcium is an element that allows plants to trigger a series of self-defense mechanisms, aiding to overcome many problems relating to environmental changes in the site in which the plant develops and grows.

On the other hand, the persons skilled in the art are also aware of the action of the substance known as MSB on plants. The action of this substance on the nature of the plants is very important because, besides acting as a potent rooting agent, induces the formation of natural self-defense known as phytoalexins. Phytoalexins are substances naturally produced by the plant that constitute natural defense mechanisms allowing the plant to fight against infections, especially those caused by bacteria and fungi. Phytoalexins are not usually stored in the plant, rather when under attack by bacteria or fungi, they start to be produced very quickly due to the action of internal elicitors (or endoelicitors), being formed around the areas in which the infection occurs.

Likewise, the MSB molecule increases the amount of calmodulin inside the plant, which is the protein responsible for calcium transport through the xylem (ascending sap).

DESCRIPTION OF THE INVENTION

Based on the indications described above in reference to the need of calcium in plants, in terms of the performance of the natural products generated by the plants themselves for self-defense purposes and the improvement in calcium transport inside the plant, the present invention has proposed as a main objective the creation of a fertilizing product that can be directly applied to the crops, and that provides the plants with the components necessary for the mentioned functions. This objective has been satisfactorily achieved by means of the fertilizing compound that will be the object of the following description, and the main features of which are listed in the characterizing part of claim 1.

DESCRIPTION OF A PREFERRED EMBODIMENT

According to the foregoing, the object of the invention consists of the formulation of a fertilizing compound that is capable of considerably increasing the calcium uptake capacity of the plants to which it is applied, resulting in plants with increased self-defense and improved preservation after harvesting.

In a preferred embodiment, the compound consists of a liquid preparation with a high calcium content, complexed with low molecular weight organic acids and lignosulfonates and enhanced by the substance MSB, as well as by amino acids. The preferred compound corresponds to the following qualitative and quantitative formula:

| | |
|---|---|
| Calcium nitrate | 45.0-62.0% |
| Calcium lignosulfonate | 8.0-14.0% |
| Organic acids | 4.5-6.5% |
| MSB | 0.2-0.5% |
| Amino acids | 1.8-3.8% |
| Water | 4.0-32.4% |

The N content in the calcium nitrate of the compound is preferably 8% and the CaO content in the calcium nitrate of the compound is preferably 16%.

In another preferred embodiment, the organic acids used are of low molecular weight and comprise polyhydroxycarboxylic acids.

In another preferred embodiment, to provide MSB and amino acids to the compound, a commercial formulation ACT-2 incorporating both ingredients is used in a range between 4.0-11.0%.

All the preceding percentages must be understood as percentages by weight.

The function of calcium lignosulfonate and of polyhydroxycarboxylic acids is to complex with calcium, retaining it such that it is available to the plant, without being locked as a result of a high soil pH, or being washed away easily.

Calcium nitrate is the main source of calcium of the formulation. MSB and amino acids are the components that stimulate the calcium penetration through the absorbing roots of the plant and that facilitate calcium transport through the xylem once in the plant.

The product manufacture starts with dissolving each of the components of the formula in hot water under constant stirring, for subsequent decanting which eliminates the insoluble portion of the mixture. Once stabilized, the solution is packed in containers having a capacity of 20 liters to 1000 liters.

The preferred application is performed by incorporating the product in the soil by means of fertigation, drip irrigation, spraying or localizing it in areas close to the plant by border irrigation, throughout the entire phase of vegetative development of the crop, dissolving it in water at the time of application, but without mixing with any other fertilizer. The total dose to be applied is comprised between 40 and 80 liters per hectare of crop, depending on the expected production and on the specific calcium needs of each plant species. This dose must be divided into as many fractions as possible during a cultivating season with at least three in number and always applied on the soil.

The present invention is additionally illustrated by means of the following examples which do not intend to limit the scope thereof.

EXAMPLE 1

Experiment Design

The test was carried out in a nectarine picking plot on July 15 with drip irrigation where a total of 50 l/ha of the experimental product was applied by means of fertigation, starting from flowering in March up to 4 weeks before picking, in the treatment plot. 100 fruits were randomly picked in the treatment plot and in the control plot.

A penetrometer (0-28 lb-force/cm$^2$) was used to determine the hardness and calcium analysis was performed with a sample in an accredited laboratory.

Mean data of the 100 fruits of each design.

|  | Fruit weight (g) | Calibre (mm) | Hardness (lb/cm$^2$) | Ca (mg/100 g of fruit) |
| --- | --- | --- | --- | --- |
| Treatment | 192.4 | 72.1 | 13.1 | 8.4 |
| Control | 187.6 | 70.8 | 11.5 | 6.2 |

The results of the experiment demonstrated that the fruit in the treated sample weighed more, was harder and had a higher calibre, all this as a result of the higher calcium content that can be seen as the last result.

EXAMPLE 2

Experiment Design

In a Golden Reinders variety apple tree plantation, several designs were made in complete lines of 150 trees with different calcium fertilizers and in a control line without any fertilizer. The fertilizer was applied by fertigation, starting from flowering up to 4 weeks before picking, with a total experimental product of 50 l/ha. The other designs are commercial calcium fertilizers which are applied according to the indication of each manufacturer and always by fertigation.

Picking was performed in September and each sample of about 2 kg of apples was delivered to an accredited laboratory on the same day.

The results of the calcium analysis:

|  | T1 | T2 | T3 | T4 | T5 | Control | Experimental product |
| --- | --- | --- | --- | --- | --- | --- | --- |
| Ca (mg/100 g of fruit) | 4.7 | 4.4 | 4.8 | 4.9 | 6.0 | 4.0 | 8.2 |

The results of the experiment demonstrated a clear increase in the calcium content in apples in the experimental product, of up to 105% with respect to the control specimen. It must be pointed out that the levels of calcium in apple above 5 mg/100 g of fruit are considered as suitable for minimizing the risk of bitter pit and of other physiological problems in cold preservation.

As a result, the compound of the invention has proven to be highly efficient in terms of activating self-defense in plant due to the increased calcium uptake by the plant tissues, given that calcium is a quality factor in plants, especially in fruits and an important activator of specific basic biological processes. This means that the use thereof significantly reduces the damage occurring on crops having specific physiopathies relating to this element (tip-burn, fruit softening, blossom-end rot, cracking, bitter-pit, etc.).

The invention claimed is:

1. A fertilizing compound for increasing the calcium content in plants and improving the preservation thereof comprising:

| | |
| --- | --- |
| Calcium nitrate | 45.0-60.0% |
| Calcium lignosulfonate | 7.0-13.0% |
| Organic acids | 4.5-6.5% |
| MSB | 0.2-0.5% |
| Amino acids | 1.8-3.8% |
| Water | 5.0-31.5%. |

2. The fertilizing compound according to claim 1, wherein the MSB and the amino acids are incorporated to the compound in a formulation in the range of 4.0-11.0%.

3. The fertilizing compound according to claim 1 wherein the compound is a water-soluble liquid formulation.

4. An application of a fertilizing compound according to claim 1 by means of fertigation, drip irrigation, spraying or localizing it in areas close to the plant by border irrigation, throughout the entire phase of vegetative development of the crop, with a total dose of between 40 and 80 liters per hectare of crop.

* * * * *